United States Patent [19]

Soderberg

[11] 4,449,544
[45] May 22, 1984

[54] BLOWDOWN VALVE

[75] Inventor: Roy E. Soderberg, N. Kingstown, R.I.

[73] Assignee: Crosby Valve & Gage Company, Wrentham, Mass.

[21] Appl. No.: 389,853

[22] Filed: Jun. 18, 1982

Related U.S. Application Data

[63] Continuation of Ser. No. 195,251, Oct. 8, 1980.

[51] Int. Cl.³ .............................................. F16K 5/20
[52] U.S. Cl. .................................... 137/15; 251/117; 251/315
[58] Field of Search ....................... 251/304, 315, 117; 137/513.5

[56] References Cited

U.S. PATENT DOCUMENTS

| | | | |
|---|---|---|---|
| 595,190 | 12/1897 | Miller | 251/117 |
| 2,757,895 | 4/1952 | Bergstrom | 251/174 |
| 3,096,965 | 5/1960 | Margus et al. | 251/170 |
| 3,126,916 | 3/1964 | Ducey | 137/246.12 |
| 3,233,865 | 2/1966 | Panzica et al. | 251/309 |
| 3,408,037 | 10/1965 | Kaiser et al. | 251/175 |
| 3,669,404 | 6/1972 | Kaiser | 251/172 |
| 3,722,545 | 3/1973 | Furiani | 137/625.3 |
| 3,841,601 | 10/1974 | Grove et al. | 251/315 |
| 4,037,818 | 7/1977 | Soderberg et al. | 251/121 |
| 4,130,128 | 12/1978 | Kaneko | 137/269 |
| 4,138,848 | 2/1979 | Wilber | 60/602 |
| 4,215,722 | 8/1980 | Sigmon | 137/625.3 |

FOREIGN PATENT DOCUMENTS 2448436  10/1974  Fed. Rep. of Germany .

Primary Examiner—Martin P. Schwadron
Assistant Examiner—James R. Shay
Attorney, Agent, or Firm—Pearne, Gordon, Sessions, McCoy, Granger & Tilberry

[57] ABSTRACT

A ball valve is provided for cleaning out piping systems between steam boilers and turbine generators of electrical power generating plants prior to start up operations. The valve is designed to minimize impingement between foreign substances trapped in the pipelines and the internal valve passages, and to reduce thermal shock to the piping systems when the valve is opened to atmosphere to rid the system of said foreign substances.

24 Claims, 1 Drawing Figure

U.S. Patent May 22, 1984 4,449,544
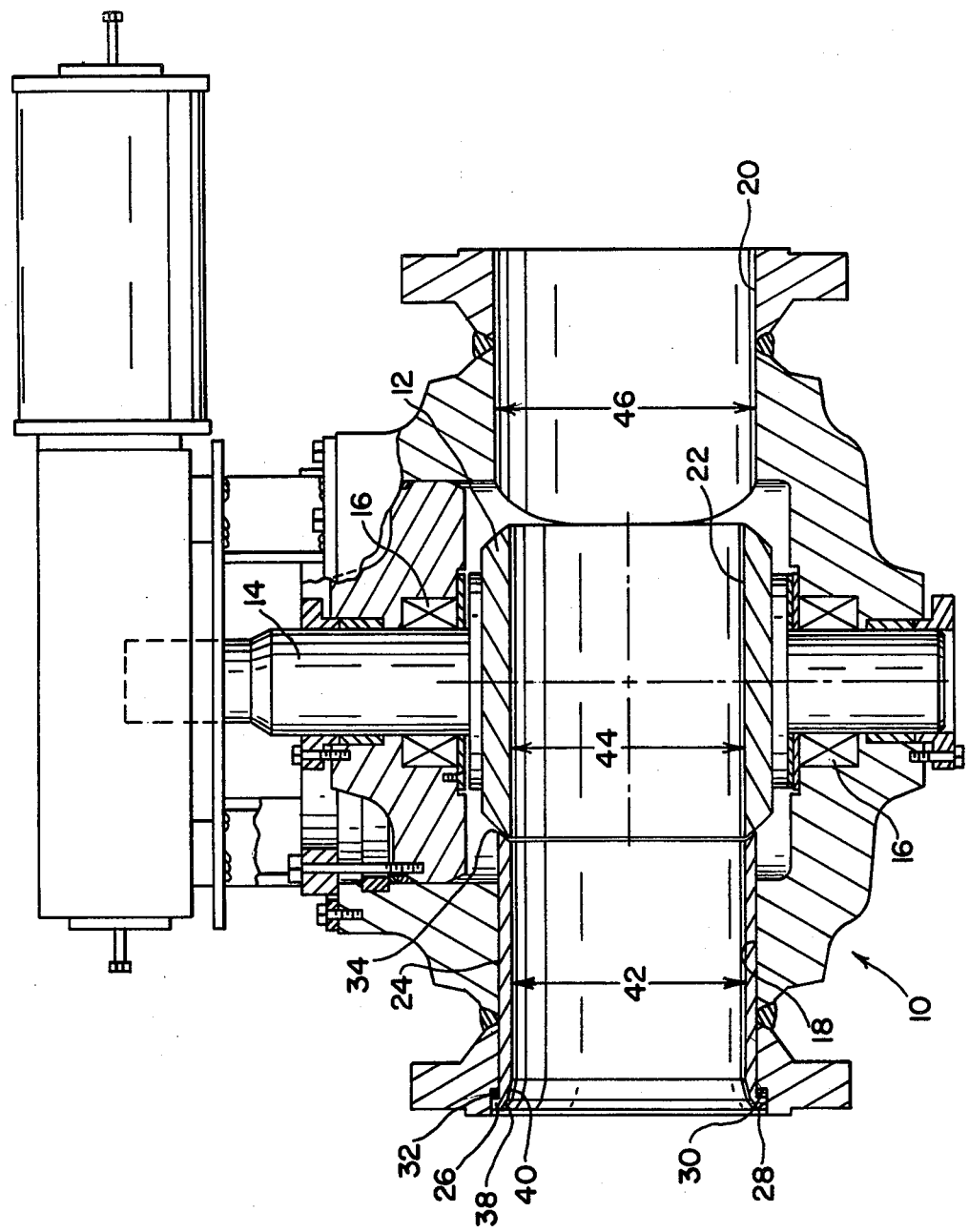

BLOWDOWN VALVE

This is a continuation of application Ser. No. 195,251 filed Oct. 8, 1980.

BACKGROUND OF THE INVENTION

In the electric utility industry there are two items of equipment which are common to all electrical generating plants, to wit, steam boilers and turbine generators. Steam boilers are connected to turbine generators by piping means usually of great diameter, such as twenty-four inches or more. Irrespective of the various means of fitting these pipes together and to the boilers and turbines, such as by bolting, welding and the like, it is a matter of practical experience that workmen inadvertently tend to leave various objects in these large diameter pipes, such as hammers, wrenches, assorted other tools, hard hats, lunch boxes, bottles, buckets and the like. If the piping is welded, then there is the possibility that welding rod, welding flux, welding scale and various oxide scales naturally accumulated within the pipe will also be a source of contamination. Additionally, other forms of contamination, such as sand, dirt, rags, etc., must also be eradicated from the system.

Thus, before a power plant can start up to generate electricity, care must be taken to insure that every foreign substance within the pipes has been discharged before steam is permitted to be carried to the turbines. Otherwise, the delicately balanced and finely machined turbine blades would be seriously damaged by impingement of a mixture of super heated steam and foreign substances. It is therefore customary to install in the pipeline intermediate the boiler and the steam generator a valve, referred to as a blowdown valve, which can be quickly opened to effect a sudden pressure drop concurrent with high velocity escape of steam from the system which carries with it all of the foreign particles and objects trapped within the piping system. A target board is set up in line with the valve outlet to intercept flying objects being ejected through the valve and the valve is left open until no further foreign matter can be detected coming from the system. Whereupon, a value judgment must be made when the system is considered to be free of harmful debris and in condition for transmission of steam from the boiler to the turbine generator.

With prior art gate valves heretofore used for blowdown service, it was necessary to install bypass piping and valve systems to permit a controlled amount of steam to continuously flow downstream in order to maintain the downstream piping temperature substantially constant at all times. Furthermore, gate valves used for this blowdown function were slow to open, and subject to gate and seating damage. As a consequence, every time a blowdown valve would be damaged by flying objects it would be necessary to shut down the line and replace the valve, a very costly and time consuming operation. This resulted in delays of from several days to several weeks before the blowdown operation could be completed. Assuming a conservative cost of service to be 400k per day, every day that a utility plant cannot generate electricity results in a considerable loss to the utility plant.

OBJECTS OF THE INVENTION

It is therefore among the objects of this invention to provide an improved blowdown valve which will perform a blowdown service in a fraction of the time required by prior art blowdown valves; to provide a blowdown valve which may be opened quicker than prior art blowdown valves for faster energy release; to provide a blowdown valve requiring no bypass line as accessory equipment; to provide a blowdown valve having no valve seats to damage; to provide a blowdown valve having a smooth passageway therethrough to minimize impediments to a free flow through; to provide a blowdown valve in which internal surfaces of the valve susceptible to damage by foreign contamination are minimized; to provide a blowdown valve in which there is a controlled gap between the ball and valve body to permit steam bypass at all times; to provide a blowdown valve which cannot be completely closed; to provide a blowdown valve having a sleeve to provide a predetermined gap between the sleeve and the ball for quick opening and steam bypass; to provide a blowdown valve which will reduce blowdown service time and cost; to provide a blowdown valve having an adjustable seating element to provide a controlled gap between the seating element and the ball; to provide a blowdown valve which eliminates thermal shock in the plumbing system without the necessity for employing accessory steam bypass equipment; to provide a blowdown valve which has no conventional seats; to provide a blowdown valve which has only one seat and which seat makes no contact with the ball, thereby reducing the turning effort of the ball; to provide a blowdown valve in which there is no seat on the downstream side of the valve; to provide a blowdown valve which eliminates seating parts; to provide a blowdown valve which eliminates complex lapping of the seats with the ball; to provide a blowdown valve which never seals; and to provide a blowdown valve which provides a minimum of impingement surfaces which are apt to retard solid objects passing therethrough.

Other objects of this invention will become apparent to those skilled in the art upon a reading and study of the following specification, drawings and claims. The invention accordingly comprises the construction hereinafter described, the scope of the invention being indicated in the appended claims.

In the accompanying drawing therein is shown a side elevation view of a ball valve in partial section illustrating a preferred embodiment of the invention.

THE INVENTION

Referring now to the drawing, therein is shown a ball valve comprising a body 10, a ball 12 journaled in said body assembly by spindle means 14 mounted in roller bearing assemblies 16. The valve body has an inlet passage 18 and an outlet passage 20. The passage 22 through the ball 12 is axially alignable with valve body inlet and outlet passages 18 and 20. Concentrically fitted within the inlet passage 18 is a spool sleeve 24 having a collar 26 on the upstream end of the spool sleeve. The collar 26 is fitted within a valve body groove 28 which provides an abutment 30 to position the spool sleeve within the inlet portion of the valve body. Shim means 32 may be positioned between the collar 26 and the abutment 30 to precisely position the spool sleeve 24 axially within the inlet 18. It will be noted that as shown, a gap 34 exists between the downstream periphery of the spool sleeve 24 and the surface of the ball 12. This gap may be adjusted to any desired width by selection of shim means 32 positioned between collar 26 and abutment 30 of the valve body 10. In a preferred embodiment of the invention, it has been found that a gap of substantially 3/16 of an inch provides satisfactory operation of the valve. It will be noted that the upstream entrance of spool sleeve 24 is provided with chamfers 38 and 40 to minimize possible interference with solid objects upon entering through the ball valve. In the alternative, these surfaces may be a single smooth curve. It will also be noted that the interior diameter 42 of the spool sleeve 24 is equal to the internal diameter 44 of the passage 22 of ball 12. Also, it will be further noted that the internal diameter 46 of the outlet passage 20 of the valve body 10 is greater than the internal diameters of the passages 42 and 44.

With the foregoing description, it will be recognized that obstructions and impediments within the interior of the valve 10 have been reduced to an absolute minimum, whereby any solid object gaining entrance into the valve will be able to pass therethrough without damaging any portion of the valve or being impeded during movement therethrough. It will be further noted that the valve contains no conventional seats, sleeve 24 being the closest approximation of a valve seat but which, as aforesaid, makes no actual contact or otherwise seat with the ball 12. Furthermore, the spacing between the ball 12 and the outlet portion of the valve body 20 is generously spaced to permit a free bypass of steam through gap 34 around the ball valve to exit through the outlet passage 20 of the valve. Additionally, with no conventional seats bearing against the ball 12, the ball is free to turn and the turning moment is thereby reduced to an absolute minimum, thus enabling the valve to be opened as rapidly as possible. This valve may be fully opened within approximately ten seconds, which is excellent opening time for a valve of large dimensions and great mass. Thus, there is herein disclosed a ball valve which cannot be completely closed, thereby permitting a flow of steam downstream on a continuous basis without accessory bypass equipment. Accordingly, the piping system will be maintained at a substantially even temperature and not be subjected to thermal shock when the valve is quickly opened.

In operation, after all piping has been installed, including installation of the subject blowdown valve, steam is admitted into the line until pressure and temperature in the line normalizes. Thereafter, the ball valve is quickly opened and permitted to remain open for as long as solid material can be detected coming out of the ball valve and striking a target board set up for this purpose. As aforesaid, with prior art ball valves, this process could take from several days to several weeks because of the necessity to continuously replace damage prior art blowdown valves until the system is finally free of contamination. In the present instance it has been the experience of the applicant that his valve will permit a blowdown service of an entire power plant piping installation between boiler and turbine to be completed in approximately one-half day, thus permitting the plant to more quickly get into operation. After all foreign material has been blown out of the piping system through the blowdown valve, the blowdown valve can then be removed from the line and the generation of electricity can begin.

The present disclosure includes that which is contained in the appended claims as well as the foregoing description. Although this invention has been described in its preferred form with a certain degree of particularity, it is understood that the disclosure of this preferred form has been made only by way of example and that other changes in the details of construction and a combination of arrangement of parts may be resorted to without departing from the spirit and scope of the invention as hereinafter claimed.

Having thus described the invention, it is claimed:

1. A method of purging a pipeline of unwanted materials therein, comprising the steps of:
   providing a valve within said pipeline, said valve including a valve body having inlet and outlet passageways, a valve ball having a bore therethrough and being journalled in said body to rotate said bore into and out of alignment with said passageways, and a gap defined between said valve body and ball establishing permanent fluid communication between said inlet and outlet passageways, said gap being relatively small in comparison to said bore and capable of passing only a relatively small amount of fluid therethrough;
   positioning said valve ball in a closed position wherein fluid communication is established between said inlet and outlet passageways only by said gap;
   admitting pressurized steam into said valve, said steam passing through said gap until the temperature within the portion of said pipeline downstream from said valve normalizes; and
   quickly opening said valve such that said bore is aligned with said passageways, thereby creating a sudden pressure drop within said pipeline whereupon unwanted materials are expelled therefrom.

2. A method as defined in claim 1, wherein said valve includes a spool sleeve positioned within said inlet passageway, including the step of adjusting said sleeve such that the downstream periphery of said sleeve is a selected distance from said valve ball.

3. Blowdown valve means comprising: a valve body having inlet and outlet passageways in axial alignment, a valve ball having a bore therethrough and being journaled in said body to rotate said bore into and out of alignment with said valve body passageways between open and closed valve positions respectively; a sleeve fitted within said inlet passageway, the downstream end of which is contoured to define a circular gap axially between said sleeve and said valve ball, said gap being sufficiently large in the axial direction so as to enable said valve ball to be freely rotatable but sufficiently small that when the valve ball is in its closed position only a small amount of fluid admitted into said inlet passageway bypasses said valve ball through said gap, the valve body and valve ball being constructed and arranged to direct all fluid passing through said inlet passageway to said outlet passageway whereby said valve means may be quickly opened with a minimum of turning effort and will receive an irregularly shaped solid object, the largest dimension of which is less than the diameter of said sleeve, for unobstructed passage therethrough.

4. The device of claim 3, wherein said inlet and outlet passageways are cylindrically smooth and are substantially the same internal diameter.

5. The device of claim 3, wherein said inlet and outlet passageways and the bore through said valve ball are cylindrically smooth, axially alignable and are substantially the same internal diameter.

6. The device of claim 5, wherein the interior of said sleeve is cylindrically smooth, the bore through said valve ball is cylindrically smooth and the same internal diameter as said sleeve, and said valve ball bore is axially alignable with said sleeve.

7. The device of claim 3, wherein the downstream side of said valve ball is adjacent said outlet passageway and spaced sufficiently upstream therefrom to be freely rotatable.

8. The device of claim 3, wherein the downstream side of said valve ball is adjacent said outlet passageway and spaced sufficiently upstream therefrom to permit bypassed fluid free access to said outlet passageway.

9. The device of claim 3, wherein the downstream side of said valve ball is adjacent said outlet passageway and spaced sufficiently upstream therefrom to permit free rotation of said valve ball and to permit bypassed fluid free access to said outlet passageway, said spacing between said valve ball and said outlet passageway being at least equal to said gap between said valve ball and said sleeve.

10. The device of claim 3, wherein said fluid is at an elevated temperature and said gap permits bypass of said fluid around said valve ball and through said outlet passageway to protect plumbing connected thereto against thermal shock when said blowdown valve means is quickly opened.

11. The device of claim 3, wherein said sleeve is secured against movement in a downstream direction.

12. The device of claim 3, wherein said gap is predetermined.

13. The device of claim 3, wherein said gap is substantially 3/16 of an inch.

14. The device of claim 3, including means to adjust said gap.

15. The device of claim 3, wherein said sleeve is provided with a collar on its upstream end; and recessed means in said valve body to receive said collar therein, whereby said sleeve is positively positioned against movement in a downstream direction.

16. The device of claim 3, wherein said sleeve is provided with a collar on its upstream end, groove means in said valve body to receive said collar therein; and shim means between said collar and said groove means to determine the spacing of the downstream end of said sleeve from said valve ball to provide said gap.

17. The device of claim 16, wherein the internal surface of said collar is outwardly flared to reduce resistance to solid objects entering said valve.

18. Blowdown valve means comprising: a valve body having axially aligned, diametrically equal, smooth cylindrical inlet and outlet passageways; a valve ball having a smooth cylindrical bore therethrough, journaled in said valve body for rotating said valve ball bore into and out of axial alignment with said inlet and outlet passageways between open and closed valve positions respectively; a smooth cylindrical sleeve fitted within said inlet passageway and adapted to be secured against movement in a downstream direction, the interior diameter of said sleeve being equal to the interior diameter of said valve ball bore, and the downstream end of said sleeve being contoured to define a circular gap axially between said sleeve and the upstream portion of said valve ball when the valve ball is in the closed position; and unobstructed space between the downstream side of said valve ball and said outlet passageway, said space being at least equal to said gap between said sleeve and said valve ball, the valve body and valve ball being constructed and arranged to direct all fluid passing into said inlet passageway to said outlet passageway whereby a solid object, the greatest dimension of which is less than the interior diameter of said sleeve, may pass freely through said valve body and said valve ball when said valve ball bore is in axial alignment with said inlet and outlet passageways.

19. The device of claim 18, wherein said gap is predetermined.

20. The device of claim 18, wherein said gap is substantially 3/16 of an inch.

21. The device of claim 18, including means to adjust said gap.

22. The device of claim 18, wherein said sleeve is provided with a collar on its upstream end; and recessed means in said valve body to receive said collar therein, whereby said sleeve is positively positioned against movement in a downstream direction.

23. The device of claim 18, wherein said sleeve is provided with a collar on its upstream end, groove means in said valve body to receive said collar therein; and shim means between said collar and said groove means to determine the spacing of the downstream end of said sleeve from said valve ball to provide said gap.

24. The device of claim 23, wherein the internal surface of said collar is outwardly flared to reduce resistance to solid objects entering said valve.

* * * * *